United States Patent [19]

Grinberg et al.

[11] 4,251,902

[45] Feb. 24, 1981

[54] APPARATUS FOR RECOVERING THE MEAT OF SMALL CRUSTACEANS

[76] Inventors: Efim N. Grinberg, ulitsa Bazhova, 13, korpus 2, kv. 119; Yakov I. Braginsky, ulitsa Moldagulovoi, 28, korpus 3, kv. 64; Igor V. Gultsev, ulitsa Malaya Schukinskaya, 15, kv. 78; Yakov M. Zhislin, Fakultetsky pereulok, 4, kv. 19; Vladimir V. Lavrov, ulitsa Narodnogo Opolchenia, 23, korpus 1, kv. 63; Viktor A. Mitrofanov, bulvar Generala Karbysheva, 18, korpus 1, kv. 19; Nikolai A. Nikitushkin, ulitsa Volgina, 15, korpus 1, kv. 43; Jury F. Yaroshenko, Novo-Basmannaya ulitsa, 17, kv. 103; Vladimir P. Bykov, Chertanovskaya ulitsa, 1-A, korpus 1, kv. 84; Samuil S. Torban, ulitsa Bolshaya Polyanka, 30, kv. 305, all of Moscow, U.S.S.R.

[21] Appl. No.: 56,923

[22] Filed: Jul. 12, 1979

[30] Foreign Application Priority Data

Jul. 13, 1978 [SU] U.S.S.R. .............................. 2631402

[51] Int. Cl.³ ............................................. A22C 29/00
[52] U.S. Cl. .......................................... 17/73; 17/48; 17/51
[58] Field of Search ................... 17/53, 71, 72, 73, 48, 17/51

[56] References Cited

U.S. PATENT DOCUMENTS

| 965,706 | 7/1910 | Greiner | 17/73 |
|---|---|---|---|
| 3,688,344 | 9/1972 | Carlson | 17/51 X |
| 4,133,077 | 1/1979 | Jasniewicz et al. | 17/71 X |
| 4,148,112 | 4/1979 | Marvin | 17/53 |

*Primary Examiner*—Willie G. Abercrombie
*Attorney, Agent, or Firm*—Lackenbach, Lilling & Siegel

[57] ABSTRACT

An apparatus for recovering the meat of small crustaceans comprises a loading mechanism, a mechanism for destroying the shell and separating it from the meat, including a receiving bell-mouth, a plain-wall curving duct with a rectilinear portion and a connection for feeding the working fluid. The connection includes a nozzle coaxial with the rectilinear portion of the duct, the latter being adjoined by a helical passage terminating in a diffuser. The invention enables recovering the meat of crustaceans in the form of a solid lump of the muscular tissue, devoid of the shell, liver, lipides, gastrointestinal tract and other impurities, and to use this meat for production of high-quality canned krill meat. The implementation of the present invention will enable the operation of a structurally simple and highly productive plant directly on the catching vessels or in the areas of krill catches in a cost-effective technology of processing antarctic krill which is a promising unconventional source of sea-provided food.

4 Claims, 1 Drawing Figure

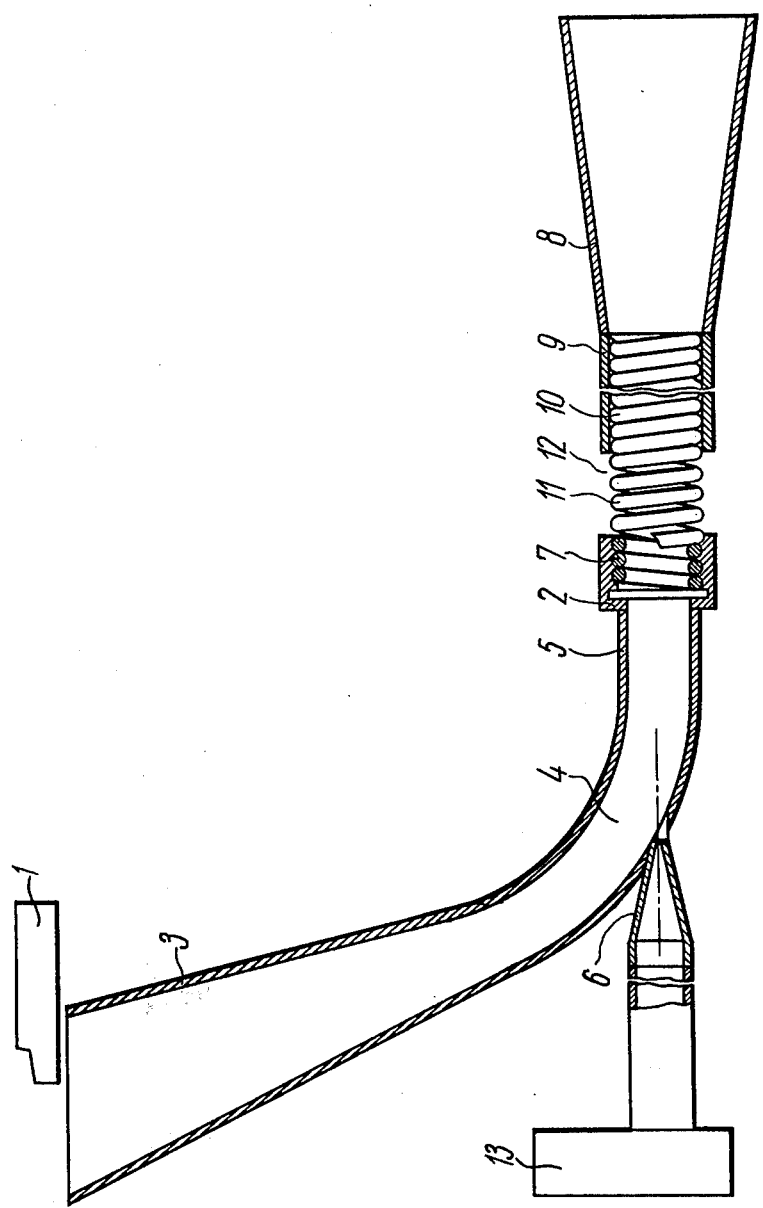

4,251,902

APPARATUS FOR RECOVERING THE MEAT OF SMALL CRUSTACEANS

FIELD OF INVENTION

The invention relates to the technology of treating sea-provided products to be used as food, and more particularly it relates to an apparatus for recovering the meat of small crustaceans.

Although the invention is primarily intended for the processing of antarctic shrimp, or krill, it also can be widely utilized by the fishing industry for processing sea and ocean shrimp. Furthermore, the invention can be advantageously used in some technologies of the agricultural production and mixed fodder manufacture.

BACKGROUND OF INVENTION

Antarctic krill presents one of the most attainable large-scale sources of significant expansion of the production of protein-containing food produce of animal origin. The catches of krill may well surpass the total catches of fish in the World Ocean at their present level. The most valuable component of krill is its pure meat in the form of lumps of the muscular tissue, the chemical composition of krill meat being close to that of the meat of crabs and shrimps and containing numerous vital aminoacids and microelements. For krill meat to be used as food, it has to be completely separated from the shell. Pure meat obtained from krill should have the minimum content of lipides and be devoid of the remnants of the liver and of the contents of the gastrointestinal tract, which impairs the quality of the final product and curtail its storage time.

When one considers that krill is caught in remote areas, which entails prolonged transportation to consumers, it becomes clear that it is expedient to process krill directly in the catching regions and to produce therefrom pure meat as either a ready-to-use product, e.g. natural canned meat, or else as a semi-finished product, e.g. deep-frozen meat.

There is known an apparatus for removing the shell of crustaceans, including a belt conveyor, a spiral or helical duct and a rotary disc with sharp spikes on its periphery.

The known apparatus operates, as follows.

Crustaceans are loaded with aid of the belt conveyor into the feed channel of the helical duct. The action of the rotating disc makes the crustaceans advance with acceleration along the predetermined path, the sharp spikes of the rotating disc incising the shell surface and destroying it. Then the meat and shell fragments are separated by flotation.

The known apparatus enables a processor to obtain the meat of shrimp in the form of individual lumps; however, these lumps are intensely crushed and disintegrated, and as a result there is a considerable loss of meat. This apparatus is predominantly intended for treating fairly large shrimp, but cannot be applied for use in removing the shell of small shrimp, e.g. of antarctic krill.

There are known devices for separating the heads of shrimps from their bodies, including a loading funnel, a guiding duct, a shrimp-processing chamber with a stationary cutting member and a pipe for feeding the working fluid.

In these known devices shrimps are fed in one-by-one fashion into the loading funnel and each shrimp advances along the guiding duct into the processing chamber where it is acted upon by a high-velocity liquid jet. The area of the connection of the head part of the shrimp is positioned adjacent to the edge of the stationary cutting member, and the effort produced by the high-velocity liquid jet is directed either at the head part or at the body of the shrimp, whereby the head and the body become separated.

These known devices perform but some of the operations of the technology of processing crustaceans, namely, those involved in separating the head from the body. The subsequent operations of destroying the shell and recovering the meat are performed by other devices, the succession of numerous operations all inadvertently involve some meat losses and generally impair the taste of the final product, on account of its prolonged contact with the liquid.

Moreover, these devices are intended for processing large shrimp, and are not practical for treating krill. Besides, the one-by-one manner of processing shrimps curbs the final output, to say nothing of its being labor-consuming and economically ineffective.

There is a further known apparatus for recovering the meat of crustaceans (cf. the DE Patent No. 2,430,095; Int. Cl.$^2$ A 22 c 29/02, published in 1976), comprising a loading mechanism and a mechanism for destroying the shell and separating it from the meat, including a plain-wall pipe with a rectilinear portion and a branch pipe for feeding the working agent or fluid.

The loading mechanism is in the form of a longitudinal belt conveyor of which the working or load-supporting portion is inclined to both sides of the longitudinal axis, toward the side boards. Arranged alongside of the conveyor belt are successively widening horizontal classification slits, with each slit adjoined by an inclined indexing trough.

The mechanism for destroying the shell and separating it from the meat includes a receiving bellmouth adjoined by an oval-section tubular duct of a shape corresponding to the contour of the crustaceans; tangentially introduced into the duct is a branch pipe or nozzle for feeding the working fluid, e.g. compressed air, the rectilinear portion of the duct accommodating the means for destroying and removing the shell, including blade-like teeth and scrapers projecting into the duct, similar to the jaws of a pike. Overlying the nozzle for feeding the working fluid, there are mounted in the duct compressed air deflecting gates, defining a sluice chamber.

The apparatus operates, as follows.

Crustaceans, e.g. crabs loaded onto the horizontal run of the belt conveyor slide down sideways and encounter the successively widening slits which classify them. The first ones to be separated are the smaller species of the crabs, the larger ones being separated subsequently. While sliding down the inclined downward trough, the crabs are indexed and directed into the mechanism for destroying the shell and separating it from the meat. In this mechanism, the crabs indexed to the predetermined attitude are first guided into the receiving bellmouth; then they pass by the compressed air gates and are taken by the compressed air stream which carries them one by one through the rectilinear portion of the tubular duct. While moving through this portion, the crabs engage the blade-like teeth which incise the shell, while the scrapers take it off the body of the crustacean. Then the stripped crabs and the shell fragments are guided to the air blower where lumps of pure meat are recovered by winnowing.

Although the last-described hitherto known apparatus enables one to obtain the meat of crustaceans in the lump form, it cannot be used for processing small crustaceans, e.g. krill.

This known apparatus is intended for recovering the meat of large crustaceans, the necessity of sorting the crustaceans according to their size and the one-by-one fashion of feeding them for processing significantly restricts the output of the apparatus. On account of the tangential arrangement of the compressed air feed nozzle, a part of the air stream is reflected by the walls of the rectilinear portion of the tubular passage and flows in opposition to the advance of crustaceans directed for the processing. This countercurrent impedes the progress of the crustaceans along the curvilinear portion of the tubular duct. For this reason, the known apparatus incorporates gates defining a sluice-like chamber to fight the effect of the aforementioned phenomenon. However, the incorporation of these gates presents an additional resistance to the progress of the crustaceans, which may result in clogging of the receiving bellmouth, to say mothing of its affecting the capacity of the apparatus and complicating its structure.

The cross-sectional shape of the tubular ducts requires precise fractions of crustaceans, which likewise complicates the structure of the apparatus.

Furthermore, the blade-like teeth mounted in the rectilinear portion of the tubular duct are capable of cutting into lumps of the meat of the crustaceans, affecting the integrity of these lumps and stepping up the losses rate, while the scrapers stripping off the shell are susceptible to becoming clogged with shell fragments, which impairs the continuous reliable operation of the apparatus and complicates its sanitary treatment.

BRIEF DESCRIPTION OF THE INVENTION

It is an object of the present invention to provide for processing small crustaceans within the entire range of their sizes, without the necessity of classifying them according to their sizes and indexing them prior to the treatment.

It is another object of the present invention to simplify the structure of an apparatus for recovering the meat of small crustaceans.

It is a further object of the present invention to enhance the reliability of the performance of an apparatus for recovering the meat of small crustaceans.

The essence of the present invention resides in an apparatus for recovering the meat of small crustaceans, such as antarctic krill and the like, comprising a loading mechanism and a mechanism for destroying the shell and separating it from the meat, including a plain-wall curving duct with a rectilinear portion and a branch pipe for feeding the working fluid. The branch pipe for feeding the working fluid includes a nozzle arranged coaxially with the rectilinear portion of the plain-wall curving duct, and this rectilinear portion is adjoined by a helical passage terminating in a diffuser.

It is expedient that the helical passage include a tube and a coil spring received in said tube, one end of this coil spring being connected with the rectilinear portion of the plain-wall curving duct, and the other end thereof being connected with the diffuser. The turns of the spring are spaced in the area adjoining the plainwall curving duct, and the tube has a cut-away portion in the same area.

BRIEF DESCRIPTION OF THE DRAWINGS

These and other objects of the present invention will become apparent from a description of the preferred embodiment of the invention, when taken in particular with reference to the accompanying drawing illustrating schematically an apparatus for recovering the meat of small crustaceans.

DESCRIPTION OF THE PREFERRED EMBODIMENT

In the drawing, the apparatus for recovering the meat of small crustaceans comprises a loading mechanism 1 of any suitable known structure, e.g. a belt conveyor or a worm screw. Adjoining the loading mechanism 1 is a mechanism 2 for destroying the shell and separating it from the meat, including a receiving bellmouth 3, a plain-wall curving duct 4 with a rectilinear portion 5, and a branch connection for feeding the working fluid which is in the form of a nozzle 6 coaxial with the rectilinear portion 5. The rectilinear portion 5 is adjoined by a helical passage 7 which terminates in a diffuser 8. The helical passage 7 is defined by a tube 9 containing therein a coil spring 10 having one end is connected to the rectilinear portion 5 of the plain-wall curving duct 4 and the other end connected to the diffuser 8. Over an area 11 adjoining the plain-wall curving duct 4, the turns or coils of the spring 10 are spaced from one another, while the tube 9 in the same area 11 has a cut-away portion 12. The branch pipe for feeding the working fluid, i.e. the nozzle 6 is connected to the source 13 of this working fluid.

The apparatus operates, as follows.

From the loading mechanism 1 providing for uniform metered-out feed of krill, the krill is fed into the receiving bellmouth 3 of the mechanism 2 for destroying or breaking up the shell and separating it from the meat. The working fluid is fed from the source 13 along the branch pipe terminating in the nozzle 6 and then into the rectilinear portion 5 of the plain-wall curving duct 4 and is in the form of a high-velocity fluid jet, with the jet advancing from the rectilinear portion 5 into the helical passage 7 and the diffuser 8. With the nozzle 6 arranged coaxially with the rectilinear portion 5, there is precluded the eventuality of the stream of the working fluid becoming reflected by the walls of the rectilinear portion 5 and of the helical passage 7, whereby no countercurrent of the working fluid is produced within the plain-wall curving duct 4, which otherwise might have impeded the advance of krill through the mechanism 2.

The jet of the working fluid produces suction in the plain-wall curving duct 4 and in the bellmouth 3, which results in air being drawn into the bellmouth 3 through which krill is thus sucked into the mechanism 2.

Due to krill species having the high-velocity jet of the working fluid flowing around them within the rectilinear portion 5 of the duct 4, a suction is created at the surface of these species, whereby the internal pressure in the cavities of the krill breaks up the shell and destroys the links between the muscular tissues and the liver and the gastrointestinal tract, and also severs the ties between the cephalothorax and the muscular tissue, partly releasing the latter. The above-listed operations take place practically instantaneously and simultaneously.

Then, the krill is directed by the flow of the working fluid into the spring 10 of the helical passage 7, where the aforementioned action of the working fluid upon the krill, assisted by intense turbulence of the jet of the working fluid and friction between the krill species in the curvilinear flow completely destroys the ties between the cephalothorax and the muscular tissue and releases the pure meat from the cephalothorax and the other components.

The open area 11 of the coil spring 10, i.e. the area through the spacings of adjacent turns of the spring 10, reduces the fluid flow resistance of the helical passage 7 and provides for the additional drawing-in of air, which prevents clogging of the bellmouth 3 with krill.

With the spring 10 accommodated in the tube 9, the latter having the cut-away portion 12, and with the respective ends of the spring 10 being connected with the rectilinear portion 5 and with the diffuser 8, the directed flow of the working fluid is enhanced, and clogging of the helical passage 7 with the matter being processed is precluded.

From the helical passage 7 the krill components are carried into the diffuser 8 where the velocity of the fluid sharply drops, whereby the difference between the amounts of kinetic energy stored by the heavier components of the krill, i,e. the muscular tissue and cephalothorax and by the lighter components, i.e. the shell, liver, legs, etc. results in the partial separation of these components which latter are directed for further treatment and finally to the complete separation of the pure meat from the waste materials.

The herein disclosed apparatus offers a high output and is operable to process small crustaceans within the entire size range, without any sorting or indexing. The simplicity of the structure of the apparatus, the accessibility of its units for maintenance and sanitary treatment are obvious.

The apparatus is devoid of sharp blade-like teeth and scrapers, which enables the recovery of meat with a minimum degree of disintegration, and consequently, with the minimum loss of meat.

The apparatus enables one to obtain from small crustaceans pure meat which is a valuable protein-containing product of animal origin, while the shell can be utilized for producing such usable matter as chitin and chitasane. The rest of the waste is processable into valuable animal feed.

The apparatus offers the yield of pure meat as high as 22 to 26 percent of the weight of the initial product.

With krill nowadays caught in bulk quantities, the implementation of the present invention is both expedient and cost-effective.

The use of the disclosed apparatus by industry enables it to perform the all-inclusive processing of krill and to obtain therefrom valuable food storage for longer periods, e.g. canned krill meat, and also valuable technical and animal feed products.

Although the present invention has been described in some detail by way of illustration and example for purposes of clarity of understanding, it will, of course, be understood that various changes and modifications may be made in the form, details, and arrangements of the parts without departing from the scope of the invention as set forth in the following claims.

What is claimed is:

1. An apparatus for recovering the meat of small crustaceans, comprising a loading mechanism, a mechanism for destroying the shell and separating it from the meat including a plain-wall curving duct with a rectilinear portion, and a connection for feeding a working fluid of said mechanism in the form of a nozzle coaxial with said rectilinear portion of said plain-wall curving duct; a helical passage adjoining said rectilinear portion of said plain-wall curving duct; and a diffuser connected to said helical passage.

2. An apparatus of claim 1, wherein said helical passage includes a tube and a coil spring accommodated within said tube, one end of said spring being connected to said rectilinear portion of said plain-wall curving duct, and the other end of said spring being connected to said diffuser.

3. An apparatus of claim 2, wherein said spring has its coils spaced from one another in an area adjoining said plain-wall curving duct, and said tube having a cut-away portion in the same area.

4. An apparatus of claim 1, including a receiving bellmouth disposed between said plain-wall curving duct and said loading mechanism for receiving said crustaceans from said loading mechanism and delivering same to said plain-wall curving duct and to said mechanism for destroying the shell and separating same from said meat.

* * * * *